United States Patent [19]

Habermeier

[11] B 3,997,510

[45] Dec. 14, 1976

[54] FLAME-RESISTANT, THERMOPLASTIC POLYESTERS

[75] Inventor: Jürgen Habermeier, Pfeffingen, Switzerland

[73] Assignee: Ciba-Geigy Corporation, Ardsley, N.Y.

[22] Filed: Nov. 5, 1974

[21] Appl. No.: 521,126

[44] Published under the second Trial Voluntary Protest Program on February 10, 1976 as document No. B 521,126.

[30] Foreign Application Priority Data

Nov. 13, 1973 Switzerland .................... 15956/73

[52] U.S. Cl. ............................ 260/75 N; 260/75 H; 260/DIG. 24

[51] Int. Cl.$^2$ ....................................... C08G 63/68

[58] Field of Search ........ 260/75 N, 75 H, DIG. 24

[56] References Cited

UNITED STATES PATENTS

| | | | |
|---|---|---|---|
| 3,763,269 | 10/1973 | Formaini | 260/75 N |
| 3,860,564 | 1/1975 | Habermeier et al. | 260/75 N |

*Primary Examiner*—Howard E. Schain
*Assistant Examiner*—W. C. Danison, Jr.
*Attorney, Agent, or Firm*—Luther A. R. Hall

[57] ABSTRACT

Linear thermoplastic polyesters which contain condensed N,N-di-(hydroxyalkyl)-halogenobenzimidazolones, are flame-resistant or flameproof and can be used for the manufacture of shaped articles of all kinds.

13 Claims, 1 Drawing Figure

FLAME-RESISTANT, THERMOPLASTIC POLYESTERS

The present invention relates to new, linear thermoplastic polyesters from aromatic and/or aliphatic dicarboxylic acids and aliphatic diols which contain, as the flame-resistant component, partially or completely co-condensed N,N-di-(hydroxyalkyl)-halogenobenzimidazolones.

It is generally known that polymers can be provided with a flame-resistant or flameproof finish by three basic methods. The first possibility is to add low molecular organic brominated or chlorinated compounds, uniform distribution being achieved, for example, by conjoint regranulation. Further, it is possible to add non-inflammable, halogenated polymers to an inflammable polymer in order to lower the inflammability. Thirdly, a halogenated monomer can be incorporated into the structure of the polymer. This latter solution has the advantage that the mechanical properties are not impaired as much as when additives are admixed. These principal methods are described, for example, in "Modern Plastics International," December 1972, page 14 to 17.

When manufacturing polyesters, either the acid component or the diol component can be halogenated. In general, aromatic dicarboxylic acids or diols which are partially or completely halogenated at the aromatic nucleus are used. Thus, for example, "Chemical Engineering News," May 1973, page 27 describes the use of 2,5-dibromoterephthalic acid for flame-resistant polyesters for use in fibres. Japanese Pat. No. 73/07,872 describes polyesters which contain co-condensed 2,5-dichloro-p-xylylene-glycol as the flame-resistant component. The use of tetrabromo-bisphenol A for the manufacture of polycarbonates is known, but because of its low reactivity this compound can only be co-condensed into polyesters with difficulty. This difficulty can also not be circumvented by using the corresponding hydroxy alkylated derivative (tetrabromo-bisphenol A-diglycol ether) instead of the brominated bisphenol A. It has been found that the compound decomposes, with elimination of hydrogen bromide, during the manufacture of polyesters and is therefore unsuitable for flameproofing polyesters.

It has now been found that flame-resistant or flameproof polyesters from terephthalic acid, isophthalic acid and/or dicarboxylic acids and aliphatic diols having improved properties, are also obtained by co-condensation of more heat-stable N,N-di-(hydroxyalkyl)-halogenobenzimidazolone. It is surprising that the polyesters are stable up to temperatures above their softening range, and that the glass transition temperatures are raised, for example, relative to pure polyalkylene terephthalates. Furthermore, the melting points or softening points of the polyesters are lowered by the addition of the diols to be used according to the invention, so that the polyesters thus exhibit, in addition to flame-resistant properties, better processability and at the same time better thermo-mechanical properties.

Accordingly, the subject of the present invention are new, flame-resistant, linear thermoplastic polyesters having a relative viscosity of 1.10 to 4.0, measured at 30°C on a 1 % strength solution consisting of equal parts of phenol and tetrachloroethane, and characterised by the general formula I wherein A denotes a radical of the formulae

$-(CH_2)_2-$ and/or $-(CH_2)_4-$, D represents an aliphatic alkylene radical with 2 to 12, especially 2 to 10, carbon atoms and/or the 1,4-dimethylenecyclohexane radical, $R_1$ each denote a hydrogen atom or the methyl, ethyl or phenyl group and $R_2$ denotes a hydrogen atom or together with $R_1$ denotes the tetramethylene radical, $X_1$ and $X_4$ independently of one another represent chlorine, a hydrogen atom or bromine atom and $X_2$ and $X_3$ represent a chlorine and/or bromine atom, $m$ represents 0 or integers and n represents integers, and the molar fraction $n/(n + m)$ determined by $n$ and $m$ can assume values from 0.005 to 1.

Preferably, the polyesters containing the structural element of the formula I have a relative viscosity of 1.3 to 3.5, D represents a linear alkylene radical with 2 to 10 carbon atoms and A denotes the meta- and/or para-phenylene radical. Particularly preferentially, in the formula I, $R_1$ represents a hydrogen atom or a methyl group and $R_2$ represents a hydrogen atom and D denotes an alkylene radical with 2 to 4 carbon atoms, especially a linear alkylene radical with 2 to 4 carbon atoms. As a further preference, $X_1$ and $X_4$, and $X_2$ and $X_3$, are identical.

Particularly preferred polyesters of the formula I are those in which $X_1$, $X_2$, $X_3$ and $X_4$ represent bromine or chlorine, $R_1$ and $R_2$ denote a hydrogen atom and the molar fraction $n/(n + m)$ is 0.1 to 1.0.

The new polyesters with the structural element of the formula I are obtained according to known processes, by polycondensing n mols, and where relevant $n + m$ mols, of terephthalic acid, isophthalic acid, succinic acid and/or adipic acid or their polyester-forming derivatives with n mols of a diol of the formula II wherein $R_1$, $R_2$, $X_1$, $X_2$, $X_3$ and $X_4$ have the same meaning as in the formula I, optionally mixed with m mols of a diol of the formula III $$HO - D - OH \quad (III)$$

wherein D has the same meaning as in the formula I, in accordance with a molar fraction $n/(n + m) = 0.005$ to 1.0, in the presence of catalysts in a known manner until a relative viscosity of 1.10 to 4.0 is reached.

Preferably, terephthalic acid and/or isophthalic acid or their polyester-forming derivatives are polycondensed, and preferably the polycondensation is carried out with a molar fraction $n/(n + m) = 0.05$ to 1.0 until a relative viscosity of 1.3 to 3.5 is reached.

The formula III represents the known aliphatic diols with 2 to 12 carbon atoms, and 1,4-dihydroxymethylcyclohexane. The linear aliphatic diols with 2 to 10 carbon atoms, especially with 2-4 carbon atoms, are preferred.

The diols of the formula II are new compounds which can be manufactured as follows. First, the corresponding 1,3-bis-(hydroxyalkyl)-benzimidazolones are manufactured by addition reaction of 2 mols of alkylene oxide, such as ethylene oxide, propylene oxide, butylene oxide, cyclohexylene oxide or styrene oxide, with 1 mol of benzimidazolone in the presence of catalysts. The compounds obtained, dissolved in a suitable solvent, are then halogenated partially or completely at the aromatic nucleus by means of corresponding molar amounts of chlorine and/or bromine. For complete halogenation, an excess of chlorine and/or bromine can also be used.

Halogenation can be carried out simultaneously with chlorine and bromine. Preferably, however, the halogenation is carried out either with chlorine or with bromine to obtain single substances. In order to manufacture defined benzimidazolone derivatives containing chlorine, hydrogen and/or bromine, the procedure followed is to prepare the mono-, di- or tri-halogenated derivatives by reaction with one, two or three mols of bromine or chlorine, and the residual hydrogen atoms can then be replaced partially or wholly by chlorine or bromine in a second reaction stage. The halogen can also be employed in a slight excess if all hydrogen atoms are to be replaced in the last reaction step.

A further process for the manufacture of the diols is the addition reaction of 2 mols of an alkylene oxide, such as ethylene oxide, propylene oxide, butylene oxide, cyclohexylene oxide or styrene oxide, with 1 mol of a partially or completely halogenated benzimidazolone, for example tetrabromobenzimidazolone, in the presence of a catalyst.

Examples of possible diols of the formula II are: 1,3-bis-(2'-hydroxyethyl)-4,5,6,7-tetrabromo-benzimidazolone, 1,3-bis-(2'-hydroxyethyl)-4,5,6,7-tetrachloro-benzimidazolone, 1,3-bis-(2'-hydroxy-n-propyl)-4,5,6,7-tetrabromo-benzimidazolone, 1,3-bis-(2'-hydroxy-n-butyl)-4,5,6,7-tetrabromo-benzimidazolone, 1,3-bis-(2'-hydroxy-2'-phenylethyl)-4,5,6,7-tetrabromo-benzimidazolone, 1,3-bis-(2'-hydroxy-2'-phenylethyl)-4,5,6,7-tetrachloro-benzimidazolone, 1,3-bis-(2'-hydroxy-n-propyl)-4,5,6,7-tetrachloro-benzimidazolone, 1,3-bis-(2'-hydroxyethyl)-5,6-dibromo-4,7-dichloro-benzimidazolone, 1,3-bis-(2'-hydroxy-n-butyl)-4,6,7-trichloro-5-bromo-benzimidazolone, 1,3-bis-(2'-hydroxyethyl)-4,6,7-tribromo-5-chloro-benzimidazolone, 1,3-di-(2-hydroxyethyl)-4,5,6-tribromobenzimidazolone, 1,3-di-(2-hydroxyethyl)-5,6-dibromobenzimidazole and 1,3-di-(2-hydroxyethyl)-5,6-dichlorobenzimidazole.

The known processes for the manufacture of the new polyesters are, for example, solution condensation or azeotropic condensation, phase boundary condensation, melt condensation or solid phase condensation as well as combinations of these methods, depending on which polyester-forming derivatives and reaction catalysts are used.

Polyester-forming derivatives of terephthalic acid, isophthalic acid, succinic acid and adipic acid which are used are mainly the low molecular dialkyl esters with 1 to 4 carbon atoms in the molecule, preferably dimethyl esters or diphenyl esters. The acid dihalides, especially the acid dichlorides and the polyanhydrides of terephthalic acid or isophthalic acid, as well as mixed anhydrides of these acids and low molecular aliphatic monocarboxylic acids, are also suitable.

The new polyesters can be manufactured by esterifying or trans-esterifying terephthalic acid, isophthalic acid, succinic acid and/or adipic acid or their low molecular dialkyl esters with the diols of the formula II, preferably mixed with the diols of the formula III, in an inert atmosphere, for example a nitrogen atmosphere, at 150°–250°C in the presence of catalysts and with simultaneous removal of the resulting water or alkanol, and subsequently carrying out the polycondendensation at 200° to 270°C and under reduced pressure, in the presence of certain catalysts, until the polycondensates have the desired viscosity.

When manufacturing polyesters which in addition to a diol to be used according to the invention also contain compounds of the formula III as the aliphatic diol component, this diol component is advantageously employed in excess, so that after the esterification or trans-esterification reaction essentially monomeric diglycol esters of the two diols of the formulae II and III are obtained, which are then polycondensed in vacuo in the presence of a polycondensation catalyst, whilst distilling off the excess aliphatic diol of the formula III.

As esterification catalysts it is possible to use, in the known manner, amines, inorganic or organic acids, for example hydrochloric acid or p-toluenesulphonic acid, or metals or metal compounds, which are also suitable for use as transesterification catalysts.

Since some catalysts preferentially accelerate the trans-esterification and others the polycondensation, a combination of several catalysts is used with advantage. Examples of suitable trans-esterification catalysts are the oxides, salts or organic compounds of the metals calcium, magnesium, zinc, cadmium, manganese, titanium and cobalt. The metals as such can also be used as catalysts. The polycondensation is catalysed, for example, by metals such as lead, titanium, germanium and especially antimony and their compounds. These catalysts can be added to the reaction mixture conjointly or separately. These catalysts are employed in amounts of about 0.001 to 1.0 per cent by weight, based on the acid component.

When manufacturing the new polyesters, it is particularly advantageous to use catalysts which accelerate both the trans-esterification and the polycondensation. As such catalysts it is above all possible to use mixtures of different metals or metal compounds, and corresponding metal alloys.

The polycondensation reaction is carried out until the polyesters have a relative viscosity of 1.1 to 4.0, preferably 1.3 to 3.5. Depending on the nature of the catalyst used and on the size of the batch, the reaction times are about 30 minutes to several hours. The resulting polyester melt is removed from the reaction vessel, cooled and then granulated, or cut into chips, in the usual manner.

Another process for the manufacture of the new polyesters is to polycondense terephthalic acid dihalides and/or isophthalic acid dihalides, preferably the acid dichlorides, with the diols of the formula II, optionally mixed with the diols of the formula III, in the presence of a basic catalyst, in the temperature range from 0° to 100°C, with elimination of hydrogen halide. Amines or quaternary ammonium salts are preferably used as the basic catalysts. The proportion of the basic catalyst can be from 0.1 to 100 mol %, relative to the acid halides. This process can also be carried out without solvents or in the presence of a solvent.

The polycondensation can also be carried out by first condensing the starting compounds in the melt up to a certain viscosity, then granulating the precondensate thus produced, for example by means of an underwater granulator, drying the granules and then subjecting them to a solid phase condensation, using vacuum and temperatures below the melting point of the granules. In this way, higher viscosities can be achieved.

When working up the polyester melt, or even prior to the polycondensation reaction, inert additives of all kinds can be added to the reaction mass, such as, for example, reinforcing fillers, especially glass fibres, inorganic or organic pigments, optical brighteners, delustering agents and agents which assist crystallisation. Further, the addition of compounds of elements of the fifth main group, especially of antimony trioxide, is preferred because of their known synergistic action. The addition of these compounds increases the flame-resistance or flameproof character, which has the advantage that a smaller amount of the flame-resistant component can then be employed and nevertheless the same action is achieved as, for example, in a polyester according to the invention which has a higher content of the flame-resistant component, corresponding to a higher total halogen content.

If the polycondensation reaction is carried out discontinuously, the inert additives can already be added during the last condensation steps, for example at the stage of the solid phase condensation or at the end of the melt condensation.

The polyesters according to the invention can be partially crystalline or amorphous, depending on which diols and which dicarboxylic acids are used as the starting component, and in what ratios these are employed. They are colourless to brown in colour and are thermoplastic materials from which flameproof shaped articles with valuable thermo-mechanical properties can be manufactured by the customary moulding processes, such as casting, injection moulding and extrusion.

The degree of flame-resistance depends on the halogen used. It is generally known that bromine has a better flame-resistant action than chlorine. Brominated bis-(hydroxyalkyl)-benzimidazolone derivatives are therefore preferred. It is also known that brominated organic compounds are generally less stable than the corresponding chlorinated derivatives. If, therefore, side-reactions of the brominated compounds to be used according to the invention lead, during the manufacture of the polyesters, to coloured products, the corresponding chlorinated compounds are advantageously employed instead. Furthermore, the flameproof character depends on the total halogen content and hence on the molar proportion of the halogenated diols according to the invention in the polyester. If the content of the halogenated benzimidazolone derivative in the polyester is greater than approx. 15 mol %, the polyesters are non-inflammable or self-extinguishing. With a lower content than 15 mol %, down to approx. 5 mol %, the polyesters are of low inflammability, whilst the inflammability is not very greatly reduced in polyesters with a content of less than approx. 5 mol %. Hence, polyesters in which the content of the component according to the invention is represented by the molar fraction $n/(n + m) = 0.05$ to 1.0, are preferred. The inflammability of the polyesters having a low content of halogenated benzimidazolone derivatives can be reduced substantially by adding, for example, antimony trioxide.

The new polyesters are particularly suitable for use as non-inflammable "engineering plastic" materials, from which shaped articles, such as gear wheels, containers for chemicals or foodstuffs, machine components and apparatus components, sheets and films, and also semi-finished goods which can be shaped by machining, are manufactured. The polyesters can also be used for coating articles, for example in accordance with the known powder coating processes.

Figure 1:
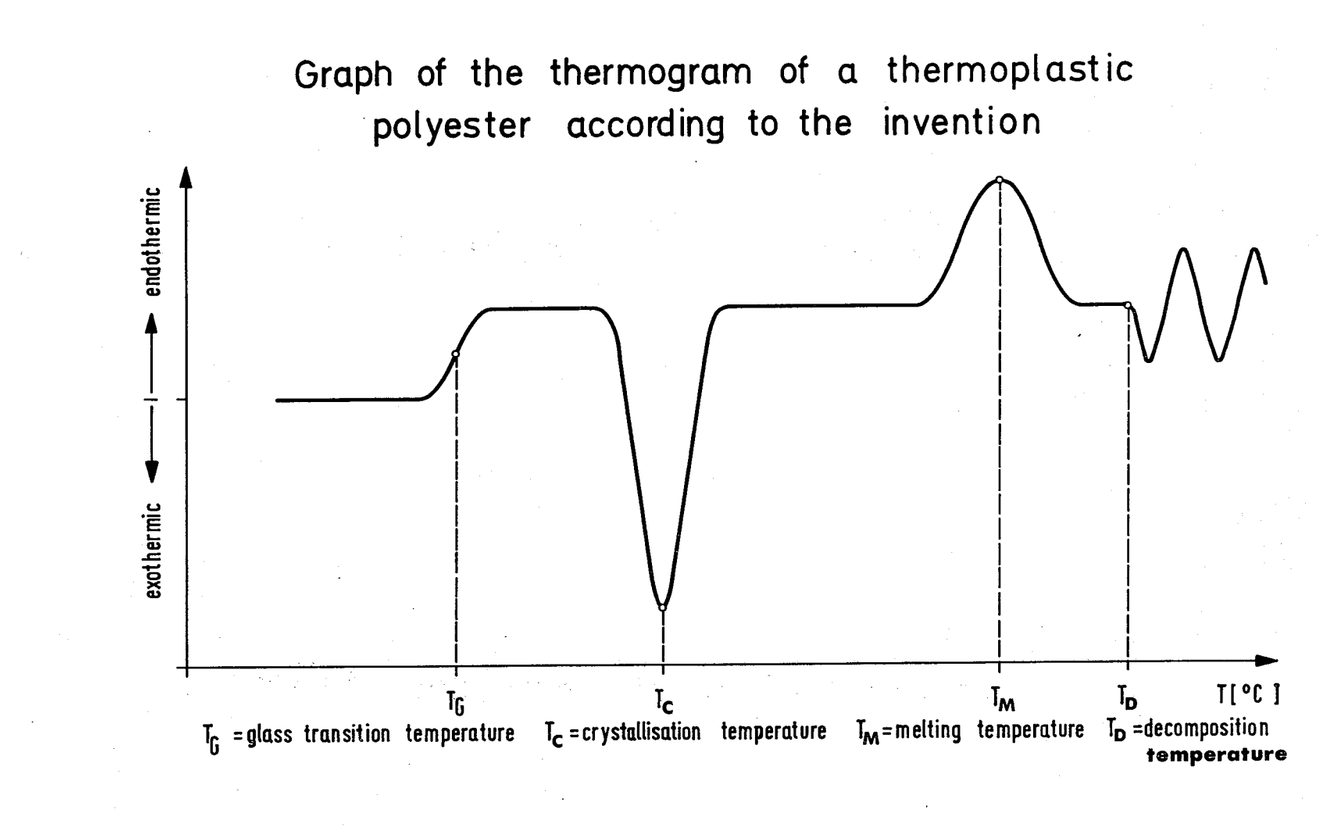

The polyesters manufactured according to the examples which follow are characterised in more detail by the data mentioned below. The polyesters are characterised by the morphological changes which are measured by means of differential thermo-analysis on a sample which has been heated for 3 minutes at 30°C above the melting point or softening point and then been chilled rapidly. The chilled sample is heated by means of the "DSC-1B" Differential Scanning Calorimeter of Messrs. Perkin-Elmer, using a speed of heating of 16°C/minute. The thermogram of the sample (compare the schematic representation in FIG. 1) shows the glass transition temperature ($T_g$), the crystallisation temperature ($T_c$) and the melting point ($T_m$). The glass transition temperature is taken to be the point of inflexion at the abrupt increase in specific heat in the thermogram, the crystallisation temperature is taken as the apex of the exothermic peak, the melting point is taken as the apex of the endothermic peak and the decomposition temperature ($T_d$) is taken as the point at which the abrupt exothermic and endothermic fluctuations in specific heat begin. The relative viscosity of the polycondensates of the examples is determined on solutions of 1 g of polyester in 100 ml of a mixture consisting of equal parts of phenol and tetrachloroethane, at 30°C. The softening point is determined on a Kofler heated stage microscope using a speed of heating of 15°C/minute, a cross being formed from 2 filaments and the softening temperature being taken to be the temperature at which the sharp angles of the cross disappear. The percentage content of the elements in the polyester is determined by elementary analysis. The inflammability is determined by holding pieces, or filaments drawn from the melt, of the polyester in the flame of a Bunsen burner, then removing them and examining whether the polyester only melts, or burns, or burns and again becomes extinguished.

EXAMPLE A

Manufacture of
1,3-bis-(2'-hydroxyethyl)-4,5,6,7-tetrabromobenzimidazolone (diol A)

333.3 g of 1,3-di-(2-hydroxyethyl)-benzimidazolone (1.5 mols) and 3.5 l of water are stirred at 90°C until a clear solution is obtained. 1,198 g of bromine (7.5 mols) are then added dropwise over the course of 30 minutes whilst stirring. Thereupon, a yellowish precipitate immediately separates out. After the dropwise addition, the mixture is stirred for a further 4–5 hours, and the internal temperature is raised to 92°–96°C. The hydrogen bromide produced in the reaction, and the excess bromine vapours, are bound by means of 5 percent strength sodium hydroxide solution in a trickle tower filled with active charcoal.

The mixture is then cooled to 5°–10°C and the product is isolated by suction filtration. It is purified by stirring it with 5 l of water and again filtering off. The product is then dried in a vacuum cabinet at 100°C.

778.5 g (corresponding to 96.6 % of theory) of a practically colourless product melting at 266.2°C (Mettler FP 51 heated stage microscope, heating speed 1°C/min.) are obtained.

For purification, 100 g of the product are recrystallised from 300 ml of dimethylformamide/isopropanol = 3 : 1. After drying at 150°C, 75.4 g of pure white needles of melting point 267.4°C are obtained. For the subsequent polycondensations, this product is again purified further by recrystallisation from ethylene glycol.

The examination of the compound by NMR and mass spectrometry is in accord with the structure of 1,3-bis-(2'-hydroxyethyl)-4,5,6,7-tetrabromobenzimidazolone.

The elementary analysis gives the following results (for $C_{11}H_{10}Br_4N_2O_3$)

| Element | found | calculated |
|---|---|---|
| Carbon | 24.76% | 24.57% |
| Hydrogen | 1.92% | 1.87% |
| Nitrogen | 5.21% | 5.21% |
| Bromine | 59.45% | 59.43% |

EXAMPLE B

Manufacture of
1,3-bis-(2-hydroxyethyl)-4,5,6,7-tetrachlorobenzimidazolone (diol B)

222.2 g of the starting material used in Example A are dissolved in 2 l of water at 90°C. 425.4 g of chlorine gas (13.4 l) are passed into this solution for 6 hours at 90°–100°C. The chlorine stream is measured by means of a Rotameter flow meter. A device for equalising the pressure is interposed between the chlorine cylinder and the Rotameter. The hydrogen chloride liberated is bound by means of 10 percent strength sodium hydroxide solution in a trickle tower filled with active charcoal. The mixture is worked up as in Example A.

333.5 g (92.6 percent of theory) of crude product are obtained in the form of colourless crystals melting at 237.8°C. For further purification, these are recrystallised from a mixture of dioxane and ethylene glycol (ratio 1:1). The colourless crystal needles thus obtained melt at 240.1°C.

The NMR spectrum of the substance agrees with the structure of 1,3-bis-(2-hydroxyethyl)-4,5,6,7-tetrachlorobenzimidazolone. The elementary analysis gives the following results (empirical formula $C_{11}H_{10}Cl_4N_2O_3$)

| Element | found | calculated |
|---|---|---|
| Carbon | 36.65% | 36.69% |
| Hydrogen | 2.76% | 2.76% |
| Nitrogen | 7.99% | 7.78% |
| Chlorine | 39.20% | 39.39% |

EXAMPLE C 1,3-Di-(2-hydroxyethyl)-4,7-dichloro-5,6-dibromobenzimidazolone a. Manufacture of 1,3-di-(2-hydroxyethyl)-5,6-dibromobenzimidazolone 333.3 g (1.5 mols) of 1,3-di-(2-hydroxyethyl)-benzimidazolone in 3,700 ml of water are warmed to 95°C whilst stirring. 511.4 g (3.2 mols) of bromine are added dropwise to this clear solution over the course of 70 minutes, during which a yellowish precipitate gradually separates out. After the dropwise addition, the reaction solution is stirred for a further 5 hours at 90°C, cooled to 10°C and filtered, and the precipitate is washed with a large amount of water, until free from acid. It is then dried to constant weight at 100°C/20 mm Hg.

537.7 g (94.3% of the theoretical yield) of colourless crystals melting at 189°C are obtained. They can be purified further by recrystallisation from a dioxane/ethylene glycol mixture (1:3). The colourless crystals melt at 195.7°C (Mettler "FP 51"; heating speed 1°C/minute).

The elementary analysis gives the following results for $C_{11}H_{12}N_2Br_2O_3$ (molecular weight = 380.036)

| Found | Calculated |
|---|---|
| 34.70% C | 34.76% C |
| 3.10% H | 3.18% H |
| 7.40% N | 7.37% N |
| 42.00% Br | 42.05% Br. |

According to a thin layer chromatogram (developing medium cyclohexane : ethyl acetate : acetic acid = 30 : 50 : 20) the crystals consist of a single substance.

The NMR spectrum ($^{13}C$ satellites : 2 singlets) shows that only a symmetrical compound without ortho-coupling can be present, so that the compound has the structure of a 1,3-di-(2-hydroxyethyl)-5,6-dibromobenzimidazolone.

b. Chlorination of a.

25 g (0.06578 mol) of the dibromo compound manufactured according to a) are dissolved in 5 liters of water at 95°C. 6 liters of chlorine gas (0.263 mol) are introduced over the course of about 90 minutes whilst stirring, during which a colourless precipitate separates out. The reaction solution is then stirred for a further 4 hours at 90°C, cooled to 10°C and filtered, and the precipitate is washed until free from acid. After drying, 24.1 g (81.4% of the theoretical yield) of colourless crystals melting at 271.7°C are obtained (Mettler "FP 51"; heating speed 1°C/minute).

The melting point of a sample recrystallised from dioxane/ethylene glycol is about 276° – 278°C.

The elementary analysis gives the following results for the crude product ($C_{11}H_{10}Cl_2Br_2N_2O_3$) (molecular weight = 448.9):

| Found | Calculated |
|---|---|
| 29.7% C | 29.43% C |
| 2.2% H | 2.24% H |
| 6.3% N | 6.24% N |
| 15.8% Cl | 15.79% Cl |
| 35.5% Br | 35.59% Br |

On the basis of the above elementary analysis results, and according to the NMR spectra, the new diol has the structure of a 1,3-di-(2-hydroxyethyl)-5,6-dibromo-4,7-dichlorobenzimidazolone.

EXAMPLE D 1,3-Di-(2-hydroxyethyl)-4,5,6-tribromobenzimidazolone

Analogously to Example A) 333.3 g of 1,3-di-(2-hydroxyethylbenzimidazolone) (1.5 mols) in 3.5 liters of water are reacted with 838.98 g of bromine (5.25 mols) at 90°–95°C. After carrying out the reaction, and working up, analogous to Example A), 633.3 g (92 percent of theory) of a colourless, crystalline crude product of melting point 201°–204°C are obtained.

The purification of this product is carried out by twice recrystallising it from 1:1 glycol-dioxane. 562.4 g of a colourless powder of melting point 207°–208°C are obtained. The product is a single compound, according to thin layer chromatography.

The elementary analysis gives the following results for $C_{11}H_{11}Br_3N_2O_3$:

| Found | Calculated |
|---|---|
| 28.70% C | 28.79% C |
| 2.40% H | 2.41% H |
| 6.20% N | 6.10% N |
| 52.90% Br | 52.2 % Br |

The NMR spectrum also agrees with the structure.

EXAMPLE E

Manufacture of 1,3-di-(2-hydroxyethyl)-5,6-dichlorobenzimidazolone

A solution of 222.2 g of 1,3-di-(2-hydroxyethyl)-benzimidazolone (1.0 mol) in 2.5 liters of water is stirred at 90°C. 2.0 g of iodine are added as the catalyst and 184 g of chlorine from a cylinder (58.24 liters = 2.6 mols) are introduced over the course of 5 hours. The stream of chlorine is controlled by means of a Rotameter. Towards the end of the introduction of the chlorine, colourless crystals precipitate from the solution, which is at 90°–95°C. After completion of the addition of chlorine, the reaction solution is stirred for a further 3 hours at 90°C and is then cooled to 5°C whilst stirring, and the product is isolated by suction filtration. The residue is washed with water at 5°C until free from acid and is dried to constant weight in a vacuum cabinet at 110°C.

The mother liquor is not worked up further; however, it still contains some of the desired product.

The crude product thus obtained is in the form of 190 g of a colourless crystalline powder (65.2% of theory); it melts at 175° – 177°C.

This crude product gives the following analytical values for $C_{11}H_{12}Cl_2N_2O_3$

| Found | Calculated |
|---|---|
| 4.3% H | 4.2% H |
| 9.7% N | 9.6% N |
| 23.0% Cl | 24.3% Cl |

This crude product can be purified by recrystallisation from dioxame, but this is not necessary for the further reaction.

The NMR spectrum ($^{13}C$ satellite : 2 singlets) agrees with the structure of a 1,3-di-(2-hydroxyethyl)-5,6-dichlorobenzimidazolone.

EXAMPLE F 1,3-Di-(2-hydroxycyclohexyl)-5,6-dibromobenzimidazolone

A solution of 20 g of 1,3-di-(2-hydroxycyclohexyl)-benzimidazolone (0.06 mol) in 2 liters of dioxane-water (1:1) is stirred at 85°–90°C, 20 ml of bromine are added dropwise over the course of 1.5 hours and the reaction solution is then stirred overnight at 90°C. The solution is cooled to room temperature and stirred into 2 liters of ice water. The product is isolated by suction filtration and the filter cake, whilst still moist, is recrystallized from ethanol.

Without working up the mother liquor, 11.3 g of colourless crystals (30 percent of theory) of melting point 150°–152°C are obtained.

The elementary analysis gives the following results for $C_{19}H_{24}Br_2N_2O_3$:

| Found | Calculated |
|---|---|
| 5.45% N | 5.73% N |
| 32.87% Br | 32.73% Br |

The $^1$H-NMR spectrum is also in accord with the structure of 1,3-di-(2-hydroxycyclohexyl)-5,6-dibromobenzimidazolone.

EXAMPLE G 250.3 g of 1,3-di-(2-hydroxy-n-propyl)-benzimidazolone (1.0 mol) are reacted with 425.4 g of chlorine in 2 liters of water at 95°–100°C in accordance with the procedure described in Example B). The reaction conditions indicated there are observed, and after completion of the reaction a crystalline mass which has flocculated is obtained. The mixture is cooled, the supernatant water is decanted and the residue is dissolved in 500 ml of dioxane and precipitated from 7 liters of cold water. Colourless fine crystals (367.2 g, corresponding to 94.6% of the theoretical yield) of melting point 138.8° C are obtained. A sample recrystallised from acetone melts at 158°C. The H-NMR spectrum is in accord with the structure shown below.

The elementary analysis gives the following results ($C_{13}H_{14}Cl_4N_2O_3$):

| Found | Calculated |
|---|---|
| 39.85% C | 40.23% C |
| 3.63% H | 3.63% H |
| 7.20% N | 7.22% N |
| 36.25% Cl | 36.54% Cl |

EXAMPLE 1

A mixture of 48.5 g of pure dimethyl terephthalate (DMT) (0.25 mol), 26.9 g of 1,3-bis-(2'-hydroxyethyl)-4,5,6,7-tetrabromobenzimidazolone (A) (0.05 mol), 49.5 g of 1,4-butanediol (0.55 mol) and 0.04 g of tetraisopropyl orthotitanate is heated to 145°C under a $N_2$ atmosphere, whilst stirring. The colourless homogeneous melt thereby produced is treated as follows: 2 hours/145°–200°C/$N_2$ atmosphere/normal pressure — in the course of which primarily methanol distils off, thereafter: 2 hours/200°C–220°C/$N_2$ atmosphere/normal pressure — in the course thereof the excess 1,4-butanediol begins to distil off, thereafter: 1 hour/220°C–235°C/$N_2$ atmosphere/760 mm Hg – 15 mm Hg; thereafter 1 hour/240°C/$N_2$ atmosphere/15 mm Hg – 0.2 mm Hg. Following this, the hot melt is poured onto a metal sheet to cool, under a stream of nitrogen. 65 g of the polyester are obtained in the form of transparent, slightly cloudy lumps. The polyester, lumps of which do not burn when exposed to a flame, though it is still slightly inflammable in the form of fibres, displays the following properties:

| | |
|---|---|
| Relative viscosity | 1.86 |
| Glass transition range (DSC) | 67–79°C |
| Softening point (Kofler) | 182°C |
| Polymer melting point $T_m$ (DSC) | 185°C |
| Decomposition point $T_d$ (DSC) | 309°C |

The elementary analysis of this polyester gives the following results for $C_{67}H_{60}N_2Br_4O_{21}$:

| Element | Found | Calculated |
|---|---|---|
| Carbon | 52.2% | 51.96% |
| Hydrogen | 4.1% | 3.90% |
| Nitrogen | 1.9% | 1.81% |
| Bromine | 20.5% | 20.64% |

In contrast thereto, customary polybutylene terephthalate (PBT) is readily inflammable; furthermore, its glass transition temperature is only 24°C.

EXAMPLE 2

The following mixture is polycondensed in accordance with the reaction conditions in Example 1; 48.5 g of pure DMT (0.25 mol), 40.35 g of diol A (0.075 mol), 49.50 g of pure 1,4-butanediol (0.55 mol) and 0.04 g of tetraisopropyl orthotitanate. A colourless copolyester is obtained, which is no longer inflammable even in the form of fine fibres. In addition to this non-inflammability, it displays the following properties:

| | |
|---|---|
| Relative viscosity: | 1.74 |
| Glass transition range (DSC): | 83–97°C |
| Softening point: | 195°C |

The elementary analysis for this polyester gives the following results:

| Element | Found | Calculated |
|---|---|---|
| Carbon | 47.7% | 47.77% |
| Hydrogen | 3.5% | 3.41% |
| Nitrogen | 2.3% | 2.37% |
| Bromine | 26.8% | 27.05% |

EXAMPLE 3

0.09 g of triethylamine and 0.02 g of magnesium filings are added to a mixture of 20.3 g of terephthalic acid dichloride (0.1 mol) and 53.8 g of 1,3-bis-(2'-hydroxyethyl)-4,5,6,7-tetrabromobenzimidazolone in 200 ml of distilled o-dichlorobenzene.

This mixture is heated to 170°–178°C under a $N_2$ atmosphere, whilst stirring. This produces a clear, pale yellow solution and a vigorous evolution of hydrogen chloride commences. After one hour, the first particles of the polymer begin to precipitate. The mixture is stirred for a further 10 hours at the abovementioned temperature and cooled, and the resulting mixture is poured into 1.5 l of methanol. After filtration, the polymer is re-suspended in 1 l of methanol, again filtered off and washed additionally with 1 l of methanol, and the product is dried for 24 hours at 100°C/20 mm Hg.

A colourless fine powder (66.5 g) is obtained, which softens at 185°C (by the Kofler method). The relative viscosity is 1.20 and the glass transition range (DSC) is 137°–152°C. In addition, the following data were determined: elementary analysis (for $C_{19}H_{12}Br_4N_2O_5$)

| Element | Found | Calculated |
|---|---|---|
| Carbon | 35.1% | 34.16% |
| Hydrogen | 1.8% | 1.81% |
| Nitrogen | 4.0% | 4.19% |
| Bromine | 46.4% | 47.84% |

EXAMPLE 4

A mixture of 48.5 g of DMT (0.25 mol), 40.35 g of the diol A (0.075 mol), 34.1 g of ethylene glycol, 0.05 g of zinc acetate and 0.07 g of antimony trioxide is trans-esterified, and polycondensed, in accordance with the following programme: 2 hours/160°–180°C/nitrogen atmosphere/normal pressure/stirring, 2 hours/240°C/nitrogen atmosphere/760 – 15 mm Hg/stirring and 2 hours/260°C/nitrogen atmosphere/15 – 0.5 mm Hg/stirring.

The clear and transparent, light ochre-coloured polyester thus obtained is isolated in accordance with Example 1. It is non-inflammable and displays the following data:

| | |
|---|---|
| Softening point (Kofler) | 204°C |
| Relative Viscosity | 1.50°C |

The elementary analysis gives the following values (for $C_{127}H_{92}Br_{12}N_6O_{43}$)

| Element | Found | Calculated |
|---|---|---|
| Carbon | 45.00% | 45.51% |
| Hydrogen | 2.80% | 2.77% |
| Nitrogen | 2.50% | 2.51% |
| Bromine | 28.60% | 28.63% |

EXAMPLE 5

A mixture of 24.25 g of DMT (0.125 mol), 24.25 g of dimethyl isophthalate (0.125 mol), 40.35 g of the diol A (0.075 mol), 34.14 g of ethylene glycol (0.55 mol), 0.05 g of zinc acetate, 0.02 g of calcium acetate and 0.07 g of antimony trioxide is condensed, and the product isolated, analogously to Example 4, under the conditions indicated there.

A glass-clear, bright, slightly coloured, noninflammable polyester with the following data is obtained:

| | |
|---|---|
| Softening point (Kofler): | 154°C |
| Relative viscosity: | 1.52 |
| Glass transition range (DSC): | 96–109°C |

The elementary analysis ($C_{127}H_{92}Br_{12}N_6O_{43}$) gives the following results:

| Element | Found | Calculated |
|---|---|---|
| Carbon | 45.4% | 45.51% |
| Hydrogen | 2.9% | 2.77% |
| Nitrogen | 2.7% | 2.51% |
| Bromine | 28.1% | 28.63% |

EXAMPLE 6

The following mixture is reacted analogously to Example 1: 48.5 g of DMT (0.25 mol), 67.3 g of diol A (0.125 mol), 49.5 g of 1,4-butanediol (0.55 mol) and 0.04 g of tetraisopropyl orthotitanate. A light-coloured, glass-clear, non-inflammable product softening at 180°C (Kofler) is obtained.

The relative viscosity is 1.51 and the glass transition range is 118° to 133°C.

EXAMPLE 7

The following reactants are polycondensed analogously to Example 1: 48.50 g of DMT (0.25 mol), 44.99 g of 1,3-bis-(2'-hydroxyethyl)-4,5,6,7-tetrachlorobenzimidazolone (0.125 mol), 49.56 g of 1,4-butanediol (0.55 mol) and 0.04 g of tetraisopropyl orthotitanate. A glass-clear, pale yellowish polyester which in the form of filaments only burns with difficulty, and which gives the following data, is obtained:

| | |
|---|---|
| Softening point (Kofler) | 165°C |
| Relative viscosity | 1.64 |

The elementary analysis gives the following results ($C_{31}H_{24}Cl_4N_2O_9$):

| Element | Found | Calculated |
|---|---|---|
| Carbon | 52.37% | 52.42% |
| Hydrogen | 3.42% | 3.41% |
| Nitrogen | 4.02% | 3.94% |
| Chlorine | 19.81% | 19.96% |

EXAMPLE 8

A mixture of 43.55 g of succinic acid diethyl ester (0.25 mol), 67.30 g of diol A (0.125 mol), 49.5 g of butanediol (0.55 mol) and 0.04 g of tetraisopropyl orthotitanate is stirred under the following conditions: 3 hours/160°– 190°C/$N_2$ atmosphere/normal pressure, 3 hours/200°–205°C/$N_2$ atmosphere/760 mm Hg – 15 mm Hg, 2 hours/250°C/$N_2$ atmosphere/15 mm Hg – 0.6 mm Hg and 5 hours/250°C/$N_2$ atmosphere/0.4–0.8 mm Hg. A glass-clear, pale ochre-coloured polyester which has a relative viscosity of 1.25 and which softens at 65°C (Kofler) is obtained. This copolyester is non-inflammable.

EXAMPLE 9

Copolyester with 25 mol% of 1,3-di-(2-hydroxyethyl)-5,6-dibromo-4,7-dichlorobenzimidazolone 31.8 g of DMT (0.164 mol) are trans-esterified, and polycondensed, with 18.7 g of 1,3-di-(2-hydroxyethyl)-5,6-dibromo-4,7-dichlorobenzimidazolone (0.042 mol) prepared according to Example C and 22.4 g of ethylene glycol (0.361 mol), under the catalytic action of 0.04 g of manganese(II) acetate and 0.04 g of zinc(II) acetate and 0.1 g of antimony trioxide, the following reaction conditions being maintained: 3 hours/150°– 210°C/nitrogen atmosphere/normal pressure, 1 hour/210°– 270°C/$N_2$/760 – 15 mm Hg and 1 hour/270°– 290°C/$N_2$/15 mm Hg – 0.6 mm Hg An amorphous, clear and transparent, non-inflammable copolyester is obtained, which softens at 180°C and has a relative viscosity of 1.67.

| | |
|---|---|
| Glass transition range (DSC): | 89–103°C |
| Decomposition point (DSC): | 310°C |

EXAMPLE 10

Copolyester with 25 mol% of 1,3-di-(2-hydroxyethyl)-4,5,6-tribromobenzimidazolone The following mixture is polycondensed analogously to Example 1: 48.5 g of DMT (0.25 mol), 28.6 g of 1,3-di-(2-hydroxyethyl)-4,5,6-tribromobenzimidazolone (0.0625 mol) (manufactured according to Example D), 49.5 g of 1,4-butanediol (0.55 mol) and 0.05 g of tetraisopropyl orthotitanate.

A glass-clear, pale yellow copolyterephthalate is thus obtained, which burns with difficulty and displays the following data:

| | |
|---|---|
| Softening point (by the Kofler method) | 190°C |
| Relative viscosity | 1.49 |
| Glass transition range (DSC) | 69–80°C |
| Decomposition point (DSC) | 325°C |

EXAMPLE 11

Copolyester with 25 mol% of 1,3-di-(2-hydroxyethyl)-5,6-dibromobenzimidazolone

The following mixture of substances, with the addition of the catalyst mixture shown below, is transesterified and polycondensed analogously to Example 9: 97.0 g of DMT (0.5 mol), 47.8 g of 1,3-di-(hydroxyethyl)-5,6-dibromobenzimidazolone (0.125 mol) (manufactured according to Example C) and 68.3 g of ethylene glycol (1.1 mol). Catalyst mixture: 0.04 g of manganese-(II) acetate, 0.04 g of zinc-(II) acetate and 0.1 g of antimony trioxide.

A copolyester of light brown colour, which burns with difficulty and displays the following data, is thus obtained:

| | |
|---|---|
| Relative viscosity | 1.40°C |
| Softening point (by Kofler method) | 180°C |
| Glass transition range (DSC) | 93–110°C |
| Decomposition point (DSC) | 330°C |

EXAMPLE 12

Copolyester with 25 mol% of 1,3-di-(hydroxyethyl)-5,6-dichlorobenzimidazolone The mixture of substances listed below is reacted under the trans-esterification and polycondensation conditions described in Example 9, with the aid of the catalyst mixture described in Example 11: 97.0 g of DMT (0.5 mol), 36.6 g of 1,3-di-(2-hydroxyethyl)-5,6-dichlorobenzimidazolone (0.125 mol) (prepared according to Example E) and 68.3 g of ethylene glycol (1.1 mol).

The resulting clear and transparent, amorphous polycondensate, which is pale light brown in colour and burns with difficulty, displays the following data:

| | |
|---|---|
| Relative viscosity | 1.80 |
| Softening point (by the Kofler method) | 170°C |
| Glass transition range (DSC) | 94–107°C |
| Decomposition point (DSC) | 327°C |

EXAMPLE 13

Homopolyterephthalate from diol B)

159.17 g of diphenyl terephthalate (0.5 mol) are mixed with 180.0 g of the diol B (1,3-di-(2-hydroxyethyl)-4,5,6,7-tetrachlorobenzimidazolone) (0.5 mol) and after addition of 0.1 g of tetraisopropyl orthotitanate the mixture is treated as follows under nitrogen, the phenol being distilled off during the trans-esterification and the subsequent polycondensation: 2 hours/200° – 220°C/N₂/760 mm Hg, 2 hours/220° – 270°C/N₂/760 mm Hg – 15 mm Hg and 2 hours/270° – 285°C/N₂/15 mm Hg – 0.7 mm Hg.

This gives the non-inflammable homopolyester of relative viscosity 1.25; it softens at 190°C (by the Kofler method) is discoloured brown and has a glass transition range (DSC) of 136° – 148°C. The decomposition point is 339°C. The chlorine content of the polyester is 28.6% (theory 28.93% of chlorine).

EXAMPLE 14

Homopolyester from diol B)

Using the method described in Example 3, the following products are reacted, in a mixture of 200 ml of o-dichlorobenzene and 330 ml of chlorobenzene, under the catalytic action of 0.2 g of triethylamine and 0.05 g of magnesium: 40.6 g of terephthalic acid dichloride freshly distilled under nitrogen (0.2 mol) and 72.0 g of diol B (0.2 mol).

After reaction analogously to Example 3, 96 g of a colourless, non-inflammable polyester powder (98% of theory) of softening point (by the Kofler method) 190°C are obtained. The relative viscosity is 1.42, the glass transition range (DSC) = 144°–155°C and the decomposition point (DSC) is 360°C.

EXAMPLE 15

Copolyterephthalate of diol B) and dodecanediol

A mixture of 281.2 g of DMT (1.45 mol), 146.5 g of 1,12-dodecanediol (0.725 mol) and 260.5 g of diol B (0.75 mol) is trans-esterified and polycondensed with the aid of a catalyst mixture of 0.2 g of zinc acetate, 0.3 g of manganese acetate and 0.5 g of antimony trioxide as follows, under nitrogen, whilst stirring: 2 hours/150° – 220°C/760 mm Hg, 1 hour/220° – 240°C/760 mm Hg, ½ hour/240° – 250°C/760 mm Hg – 15 mm Hg, 1½ hours/250° – 260°C/15 mm Hg – 0.7 mm Hg and ½ hour/260° – 280°C/0.7 mm Hg.

A clear, pale coloured copolyester which burns with difficulty and has a relative viscosity of 1.35 and a softening point of 110°C is obtained.

EXAMPLE 16

Copolyterephthalate of diol B and cyclohexane-1,4-dimethanol 291.3 g of DMT (1.5 mols), 108.2 g of cyclohexane-1,4-dimethanol (0.75 mol) and 269.9 g of diol B (0.75 mol), together with 0.2 g of zinc acetate and 0.3 g of manganese acetate, are stirred for 2 hours under nitrogen in a glass apparatus at a temperature gradually rising from 160°C to 220°C, during which the trans-esterification occurs and methanol distils off. The pre-condensation is then commenced by raising the temperature from 220°C to 240°C over the course of one hour. The mobile melt thus obtained is introduced under nitrogen into a stainless steel polycondensation vessel preheated to 240°C, 0.6 g of antimony trioxide being added. The melt is then heated to 260°C over the course of 2 hours at 15 mm Hg. The condensation is then continued for 2 hours at 270°C/0.7 mm Hg.

This gives a practically colourless, glass-clear copolyester which burns with difficulty and has a relative viscosity of 1.3 and a softening point of 160°C.

EXAMPLE 17

Homopolyterephthalate of 1,3-di-(2-hydroxycyclohexyl)-5,6-dibromobenzimidazolone 20.3 g of freshly distilled terephthalic acid chloride (0.1 mol) and 48.8 g of the 1,3-di-(2-hydroxycyclohexyl)-5,6-dibromobenzimidazolone (0.1 mol) manufactured according to Example 15 of Case 3-9097/E are reacted in 250 ml of freshly distilled o-dichlorobenzene, under the catalytic action of 0.1 g of triethylamine and 0.03 g of magnesium, in accordance with the method explained in Example 3. After working up analogously to Example 3, a colourless powder is obtained, which softens at 240°C and has a glass transition range of 220°–231°C and a relative viscosity of 1.2. Lumps of this homopolyester are non-inflammable.

EXAMPLE 18

Copolyester with 25 mol% of 1,3-di-(2-hydroxy-n-propyl)-4,5,6,7-tetrachlorobenzimidazolone The following mixture of substances is reacted analogously to Example 1, under the catalytic action of 0.03 g of tetraisopropyl orthotitanate: 35.8 g of DMT (0.185 mol), 18.0 g of 1,3-di-(2-hydroxypropyl)-4,5,6,7-tetrachlorobenzimidazolone (0.0463 mol) (manufactured according to Example G) and 36.5 g of 1,4-butanediol (0.406 mol).

This gives a copolyester having a softening point (by the Kofler method) of 140°C, a $T_g$ of 86°C and a relative viscosity of 1.45.

EXAMPLE 19

Co-PET with 0.5 mol% of diol A 4.03 g of diol A (0.0075 mol) are reacted with a mixture of 291.3 g of DMT (1.5 mols) and 204.8 g of ethylene glycol (3.3 mols) analogously to Example 4, under the action of a catalyst mixture of 0.2 g of zinc acetate, 0.2 g of calcium acetate and 0.5 g of antimony trioxide. A colourless, partially crystalline polyester of relative viscosity 1.50 is obtained. The softening point is 203°C. The bromine content is 1.6% and the $T_g$ is 74°C.

EXAMPLE 20

Co-PET with 5 mol% of diol A (bromine content in the copolyester: 7.4%)

Analogously to Example 4, 40.34 g of diol A (0.075 mol) are condensed with the DMT-glycol mixture used in Example 19, under the action of the catalyst mixture described in Example 19. A partially crystalline copolyester having a relative viscosity of 1.83 and a softening point (by the Kofler method) of 170°C is obtained. The glass transition point is 89°C.

What we claim is:

1. A flame-resistant, linear, thermoplastic polyester having a relative viscosity of 1.10 to 4.0 dl/g, measured at 30°C on a 1% strength solution consisting of equal parts of phenol and tetrachloroethane, and characterised by the general formula I wherein A denotes a radical of the formulae —$(CH_2)_2$— or —$(CH_2)_4$—, or a mixture of the above mentioned A radicals; D represents an aliphatic alkylene radical with 2 to 12 carbon atoms or the 1,4-dimethylenecyclohexane radical, or a mixture of the aforementioned D radicals; $R_1$ each denote a hydrogen atom, or the methyl, ethyl or phenyl group and $R_2$ denotes a hydrogen atom or together with $R_1$ denotes the tetramethylene radical, $X_1$ and $X_4$ independently of one another represent chlorine, a hydrogen atom or a bromine atom and $X_2$ and $X_3$ independently represent a chlorine or a bromine atom, $m$ represents 0 or integers and n represents integers, and the molar fraction $n/(n+m)$ determined by $n$ and $m$ can assume values 2. A polyester according to claim 1, characterised in that in the formula I D represents a linear alkylene radical with 2 to 10 carbon atoms.

3. A polyester according to claim 1, characterised in that in the formula I $X_1$, $X_2$, $X_3$ and $X_4$ either represent chlorine or bromine.

4. A polyester according to claim 1, characterised in that in the formula I A represents the meta- or paraphenylene radical or a mixture thereof.

5. A polyester according to claim 1, characterised in that the relative viscosity is 1.3 to 3.5.

6. A polyester according to claim 1, characterised in that the molar fraction $n/(n+m)$ is 0.05 to 1.0.

7. A polyester according to claim 1, characterised in that in the formula I A represents the meta- or paraphenylene radical or a mixture thereof, D represents a linear alkylene radical with 2 to 10 carbon atoms and $X_1$, $X_2$, $X_3$ and $X_4$ represent chlorine or bromine.

8. A polyester according to claim 7, characterised in that in the formula I, $R_1$ represents a hydrogen atom or the methyl group and $R_2$ represents a hydrogen atom.

9. A polyester according to claim 7, characterised in that in the formula I D represents an ethylene, propylene or butylene radical.

10. A polyester according to claim 9, characterised in that in the formula I $X_1$, $X_2$, $X_3$ and $X_4$ represent bromine or chlorine, $R_1$ and $R_2$ each denote a hydrogen atom and the molar fraction $n/(n+m)$ is 0.1 to 1.0.

11. A polyester according to claim 1, characterised in that D represents an aliphatic alkylene radical with 2 to 10 carbon atoms and $X_1$, $X_2$, $X_3$ and $X_4$ independently of one another denote a chlorine atom or bromine atom.

12. A polyester according to claim 1, characterised in that $X_1$ and $X_4$ are identical.

13. A polyester according to claim 1, characterised in that $X_2$ and $X_3$ are identical.

* * * * *